United States Patent [19]

Kagawa et al.

[11] Patent Number: 5,723,443
[45] Date of Patent: Mar. 3, 1998

[54] LIPID METABOLISM PROMOTING AGENT AND ITS USE

[75] Inventors: Kyoichi Kagawa, Ibarakishi; Takaya Kaneda, Kagoshima; Tetsuo Tadokoro, Nishinomiya; Yoshikazu Matsumura, Neyagawa, all of Japan

[73] Assignee: Hankyu-Kyoei Bussan Co. Ltd., Osaka, Japan

[21] Appl. No.: 608,045

[22] Filed: Feb. 28, 1996

Related U.S. Application Data

[63] Continuation of Ser. No. 214,069, Mar. 16, 1994, abandoned, which is a continuation of Ser. No. 980,325, Oct. 9, 1992, abandoned, which is a continuation of Ser. No. 427,092, filed as PCT/JP89/00107 Feb. 2, 1989 published as WO89/06970 Aug. 10, 1989, abandoned.

[30] Foreign Application Priority Data

Feb. 2, 1988 [JP] Japan ..................... 63-23624

[51] Int. Cl.$^6$ ............... A23J 1/06; A61K 38/03; C07K 4/12; C12P 21/06
[52] U.S. Cl. ............... 514/18; 424/439; 424/440; 424/442; 426/648; 426/657; 435/68.1; 530/343; 530/829
[58] Field of Search ............... 514/18; 435/68.1; 530/343, 330, 331, 829; 426/648, 657; 424/439, 440, 442

[56] References Cited

U.S. PATENT DOCUMENTS

| 4,220,725 | 9/1980 | Eckmayer et al. | 435/265 |
| 4,330,463 | 5/1982 | Luijerink | 426/647 |
| 5,198,357 | 3/1993 | Holmouist et al. | 435/240.26 |

FOREIGN PATENT DOCUMENTS

| 044032 | 1/1982 | European Pat. Off. |
| 59-76022 | 4/1984 | Japan |
| 60-11425 | 1/1985 | Japan |

OTHER PUBLICATIONS

JA 60-11425—Claim 1-7/English (Jan. 1985).
JA 59-76022—Claims 1-3/English (Apr. 1984).
A Course in Biochemistry, pp. 2 and 164-167. (Partial translation thereof). (not dated).

*Primary Examiner*—Jeffrey E. Russel
*Attorney, Agent, or Firm*—Felfe & Lynch

[57] ABSTRACT

The invention concerns a low molecular weight proteinaceous agent which can be used to reduce body fat content by suppressing fat digestion and absorption thus reducing body fat and limiting excess fat accumulation. The proteinaceous material is a mixture of low molecular weight peptides. This mixture has about at least 50-67% of peptides having an average chain length of 3-4 amino acids. This material is administered to subjects in amounts of at least 0.1 to 50 weight percent relative to the amount of fat consumed by the subject.

8 Claims, No Drawings

LIPID METABOLISM PROMOTING AGENT AND ITS USE

This application is a continuation of Ser. No. 08/214,069, filed Mar. 16, 1994, now abandoned, which is a continuation of Ser. No. 07/980,325, filed Oct. 9, 1992, now abandoned which is a continuation of Ser. No. 07/427,092, filed as PCT/JP89/00107 Feb. 2, 1989 published as WO89/06970 Aug. 10, 1989, now abandoned.

FIELD OF THE INVENTION

The present invention relates to a lipid metabolism promoting agent and its use for preventing or treating high blood pressure or arteriosclerosis in the human body or for improving meat quality of foodstuff such as cattle or fish.

BACKGROUND AND PRIOR ART

In order to prevent or treat high blood pressure and arteriosclerosis, it is known to combine restriction of fat intake with administration of medicines such as dextran sulphate in order to suppress the digestion and absorption of lipids or to promote blood lipoprotein lipase activity. As lipid absorption suppressing agents, medicines such as Nicomole are known. As lipid metabolism promoting agents, pancreatic elastase or the like, as well as the above-noted dextran sulphate are known. However, medicines such as Nicomole inevitably have undesirable side effects.

In the livestock and marine products industries, it is common practice to give high calorie type feeds which contain a large amount of fat and protein to cattle or fish. As a result, the animals tend to have excessive amounts of fat in their meat. In recent years, however, the health-conscious population has preferred lean meat, to control the amount and quality of its fat intake. That is to say, what is desired today is to restrict fat intake and excess fat accumulation in the body and to improve the quality of the accumulated body fat, without inviting unfavorable side effects.

SUMMARY OF THE INVENTION

The primary object of the invention is to overcome the above-described drawbacks of the prior art and to provide a lipid metabolism promoting agent and its use in order to suppress excess fat intake and to suppress excess fat accumulation in the body, as well as to improve the quality of accumulated body fat without inviting unfavorable side effects.

In order to accomplish the above objects, the lipid metabolism promoting agent of the present invention comprises a low molecular weight peptide prepared through hydrolysis of a protein or a protein-containing material by a protease or an acid, with the low molecular weight peptide being approximately 3 to 4 amino acids in length.

Use of lipid metabolism promoting agents in accordance with the present invention comprises the step of administering in an amount ranging from 0.1 to 50 wt. % relative to total fat intake consumed at the time, a particular lipid metabolism agent which includes, as an effective component thereof, a low molecular weight peptide prepared through hydrolysis of a protein or a protein-containing material, approximately 3 to 4 amino acids in length. Accordingly, using ordinary foodstuffs, the amount of the agent administered may be as little as about 1 wt. % relative to the total foodstuff intake. Further, even with fatty foodstuffs having lipid content of approximately 20 to 40%, the amount administered may be no greater than 4 to 20 wt. % relative to total food intake.

Through intensive research and various experiments, the inventors of the present invention have found that ingestion of from 0.1 to 50 wt. %, preferably 1 to 30 wt. % relative to the total fat intake, of the low molecular weight peptide described herein is most effective for suppressing in vitro lipase activity on lipids. In addition, it has become clear that the above agent, when fed alone or in combination with foodstuff or feed, reduces fat digestion and absorption, decreases triglyceride and cholesterol concentration in the blood, and reduces fat content and fat droplets in the liver without affecting the amount of protein contained in the blood or liver tissue. Moreover, the agent has been shown to reduce the amount of excess body fat and to improve the composition quality of lipids in the body, i.e., to decrease saturated fat content with increased unsaturated fat resulting thereby.

It is common knowledge among those skilled in the art that a high intake of protein may bring about reduction in excess body fat. However, in order to achieve this effect, the high-intake-protein must be no less than 40 wt %, as compared with about 20 wt % intake in the case of a normal diet. In sharp contrast to this, the agent of the present invention is needed at only about 1 wt. % in order to achieve the desired effect of suppressing fat digestion and absorption and thus to reduce body fat. Also, the use of the lipid metabolism promoting agent of the present invention is clearly distinguishable from other commercially available low molecular weight peptides which are invariably used as an effectively absorbed protein source. In other words, the agent of the invention differs from the conventional low molecular weight peptide agents both in dosage and in object.

In manufacturing the low molecular weight peptide of the invention using a protease, the ratio between the protease and the protein is 0.1 to 5 units of protease relative to 1 mg of protein to be broken down. The manufacturing operation is carried out for 3 to 48 hours, preferably 16 to 30 hours, at a temperature of 20 to 70 degrees Celsius, preferably 40 to 60 degrees Celsius. One unit of protease activity is defined as the amount of enzyme that produces non-proteinaceous substances equivalent to 1 ug of tyrosine colored with Folin's reagent, in 1 minute at 30 degrees Celsius and at the optimum pH of the enzyme, using milk casein as the substrate.

One example of the manufacture of low molecular weight peptides in accordance with the invention is now described. First, a solid sample of an appropriate protein or protein-containing substance, the protein being of animal, plant or micro-organism origin, is suspended in water at 5 to 30 w/v %, and the pH is adjusted to the optimum pH of the protease being used (acid or alkaline). Next, the protease is added to the mixture in one or several doses, and the reaction mixture is allowed to stand for 3 to 48 hours, at a temperature between 20 to 70 degrees Celsius. This yields a solution of low molecular weight peptides.

The thus obtained low molecular weight peptide solution is dried by a spray-drier, or, alternatively, the low molecular weight peptide solution is combined with an appropriate amount of an extending agent such as carboxymethylcellulose or dextran and then dried, whereby a lipid metabolism promoting agent is obtained.

The above-described lipid metabolism promoting agent of the present invention, when taken in an amount of 0.1 to 50% or preferably 1 to 30% relative to total fat intake weight, is capable of effectively suppressing digestion and absorption of fat and of improving lipid metabolism without incurring unfavorable side effects. As a result, the agent is useful for preventing and treating high blood pressure, arteriosclerosis or obesity in humans. In addition, the agent, if added to animal feed, may be effectively utilized in the livestock and marine products industry in order to limit excessive fat accumulation in the meat of the animal and to improve the composition quality of the body fat of the animal.

DETAILED DESCRIPTION OF PREFERRED EMBODIMENTS

The low molecular weight peptides useful as an effective component of a lipid metabolism promoting agent are made by hydrolyzing a protein or a protein-containing material with a protease or an acid to form low molecular weight polypeptides, of, on the average, 3–4 amino acids length. This hydrolysis product can additionally contain amino acids, dipeptides or high molecular weight peptides. Alternatively, the low molecular weight peptide may be refined so as to eliminate all or most of the aforementioned amino acids or high molecular weight peptides. Preferably, the fraction of the 3 to 4 average amino acid chain length peptides in the product of the hydrolysis should be no less than 50%. These low molecular weight peptides do not lose their inhibiting effect on lipase, even if autoclaved (121 degrees Celsius, 1.1. kg/cm$^2$, 30 min), or heated for 30 minutes in a boiling water bath.

The above-noted protease may originate from microorganisms such as *Aspergillus niger*, or *Bacillus subtilis*. One or more of an acid protease, neutral protease or an alkaline protease may be used and these may be of animal origin, plant origin or a combination of proteases from both sources. As acid, an inorganic acid such as hydrochloric acid or sulfuric acid is employed. It is to be noted, however, that a protease rather than an acid is preferred for efficiently producing the low molecular peptide of about 3 to 4 average amino acid chain length.

Specific manufacturing methods for making the low molecular weight peptides of the invention are now described.

The average amino acid chain length (L) of the product is expressed by the following equation:

$$L = \frac{\text{Total number of } \alpha\text{-amino groups in the complete hydrolysate using HCl}}{\text{Total number of chains of } \alpha\text{-amino groups in the product}}$$

The amount of $\alpha$-amino groups liberated was determined by the ninhydrin method. Complete hydrolysis was carried out in 6N hydrochloric acid at 110 degrees Celsius for 24 hours. Also, the distribution of molecular weight of the product was examined by gel filtration using Toyopearl HW-40S (column: 2.2 cm×50 cm, solvent: 0.1M acetate buffer solution pH 5.7).

EXAMPLE 1 a) 250 liters of water was added to 100 kg of red blood corpuscles of cattle. The pH of the mixture was adjusted to 2.8 with phosphoric acid. Then, to this mixture, 2×10$^7$ units of acid protease originating from *Aspergillus niger* were added, and incubated at 50 degrees Celsius for 20 hours.

After this reaction, the reaction mixture was heated at 80 degrees Celsius for 30 minutes so as to stop the reaction. Then, calcium hydroxide suspended in water was added to the mixture so as to adjust the pH to 6.5. 10 kg of diatomaceous earth was then added. The mixture was then filtered by a filter press, and the filtered liquid was spray-dried to produce 23 kg of powder. The average amino acid chain length of this powder was measured to be 3.6. Also, further measurements on molecular weight distribution revealed that the fraction with 3 to 4 average amino acid chain length occupied approximately 65 wt. % of the product.

b) 50 kg of defatted fish powder was suspended in 200 liters of water. The pH of the suspension was then adjusted to 2.8 with phosphoric acid. To this mixture, 3×10$^7$ units of acid protease, as described supra, was added, and 21 kg of powder were obtained. Steps following addition of protease are as in "a" supra. The average amino acid chain length of this powder was measured to be 3.5. Further measurements on molecular weight distribution revealed that the fraction with 3 to 4 average amino acid chain length occupied approximately 63 wt. % in the product.

c) 40 kg of soya protein isolate was suspended in 200 liters of water. Then, the pH of the suspension mixture was adjusted to 2.8 with phosphoric acid. To this mixture, 3×10$^7$ units of acid protease from *Aspergillus niger* were added. Through the same process described supra, 27 kg of powder were obtained. The average amino acid chain length of this powder was measured to be 3.6. Further measurements on molecular weight distribution revealed that the fraction with 3 to 4 average amino acid chain length occupied approximately 67 wt. % in the product.

From the above experiments, it may be seen that low molecular weight peptides with an average amino acid chain length of approximately 3 to 4 may be readily manufactured.

The thus prepared low molecular weight peptides were compared with each other as to the acquired lipid metabolism promoting effects. The comparisons revealed that low molecular weight peptide derived from the soya protein achieved weaker effects than the others based on animal proteins. In addition, the efficacy of the peptide differs, depending on the kind of protease used to hydrolyze the protein.

EXAMPLE 2

The effects of the low molecular weight peptides, when used as the effective ingredient in lipid metabolism promoting agents in accordance with the invention were confirmed via animal experiments. First, suppression of fat digestion and absorption was seen from histological observations, as a decrease in the lipid droplets present in the intestinal epithelial cells after oral administration of olive oil. It was also observed that blood lipid levels, especially neutral lipid levels, were suppressed. Further, through animal testing consisting of four weeks of free feeding of the agent, it was observed that the agent reduced body fat weight and also improved its lipid composition. That is to say, the administration of the low molecular weight peptides proved to be effective for suppressing lipid digestion and absorption and for improving the lipid composition quality, i.e., by reducing saturated fat content with a corresponding increase in unsaturated fat content.

EXAMPLE 3

This example describes closer observation of the effect of the low molecular weight peptides to distinguish between their suppressing effect on lipid digestion using a single dose, and its effect on reducing body fat after repeated administration over a long term. The observations revealed that some of the various low molecular weight peptides are more effective in a single administration while others are more effective over the term. For this, it may be reasonably assumed that a desired effect may be intensified through proper selection among the kinds of peptides and dosage of each of the peptide compositions.

EXAMPLE 4

In order to investigate the effect of the low molecular weight peptides or in vitro lipase activity, from 100 ng/ml to 1 mg/ml of low molecular weight peptides having an average amino acid chain length of approximately 3 to 4, were added to about 0.3 units/ml of pancreatic lipase, and 0.125 ml/ml of the substrate olive oil. It is to be noted that one unit of lipase activity is defined as the amount of an enzyme that produces 1 μmol of fatty acid in 1 minute at 37 degrees Celsius.

The experiments were conducted for the low molecular weight peptides obtained from soya protein, low molecular weight peptides obtained from fish powder, low molecular weight peptides obtained from red blood corpuscles, and peptides having an average chain length of 15 amino acids obtained from red blood corpuscles by the manufacturing method described supra, except that the reaction time was 1 hour. The results, as shown in Table 1 show the activity ratio (%), indicate that lipase activity was inhibited by the addition of the low molecular weight peptides.

EXAMPLE 5

In order to investigate the effect of low molecular weight peptides on fat digestion and absorption during intake of fat, 5 mg of the red blood corpuscle based low molecular weight peptides, which were shown to provide the weakest inhibitory action for lipase, along with 250 mg of olive oil, were given to five-week old ICE strain male mice (weighing about 20 g) by gastric tube. Then after 120 minutes, cholesterol and triglyceride in the blood plasma were measured. The results, as shown in Table II, indicate that in spite of the feeding of olive oil, the low molecular weight peptides rendered both cholesterol and triglyceride values lower than those in the reference animals given olive oil alone.

EXAMPLE 6

In order to investigate the effect of repeated administration of the low molecular weight peptides on fat digestion and absorption, 1 wt. % of the low molecular weight peptides used in Example 5 was mixed into a powdered feed (raw fat content: 5%, manufactured by Oriental Yeast Inc. Ltd.) and the mixture was freely given to 7-week old ICR strain male mice (weighing about 30 g) by gastric tube for 14 days. Then, on the 15th day, 250 mg of olive oil was forcibly given to the animals by a gastric tube. After a lapse of 90 minutes, cholesterol and triglyceride in the blood plasma were measured. The results, as shown in Table III, indicate that both of the values after the 14 days of repeated administrations of the low molecular weight peptides were lower than those in reference mice and, further, that any increases in these values due to the feeding of olive oil were completely suppressed by the simultaneous administration of the low molecular weight peptides.

TABLE I (Experiment) (% of activity)

| peptide concentration log (g/ml) | low molecular weight peptide | | | peptide |
|---|---|---|---|---|
| | soy | fish | red blood cell | red blood cell |
| −7 | 36 | 52 | 41 | 66 |
| −6 | 0 | 0 | 19 | 55 |
| −5 | — | — | 0 | 50 |
| −4 | 25 | 42 | 53 | — |
| −3 | 32 | 47 | 92 | — |

TABLE II (Experiment 2)

| treatment | cholesterol (mg/dl) | triglyceride (mg/dl) |
|---|---|---|
| no treatment | 114 | 99 |
| olive oil alone | 124 | 692 |
| both olive oil and red blood corpuscle peptide | 93 | 77 |

TABLE III (Experiment III)

| treatment | cholesterol (mg/dl) | triglyceride (mg/dl) |
|---|---|---|
| no treatment | 100 | 99 |
| 14 days administration of red blood corpuscle peptide | 90 | 60 |
| olive oil alone | 132 | 328 |
| both olive oil and 5 mg of red blood corpuscle peptide | 110 | 140 |
| both olive oil and 50 mg of red blood corpuscle peptide | 90 | 100 |

EXAMPLE 7

In order to investigate the effect of low molecular weight peptides on fat digestion and absorption, the ratios of lipids digested by subjects were measured for an 11-day control period using three groups of pigs, with each group consisting of three pigs. Test group I was fed for 12 days with a feed mixture containing a digestive enzyme. Testing group II was fed also for 12 days with a further feed mixture containing the digestive enzyme and 0.1 wt. % of the low molecular weight peptides described in Example 5. Group III, the control, received unaltered feed. Lipid digestion was examined through measurement of the amount of lipid contained in the feces of the animals. The results, as illustrated in Table IV show that lipid digestion increased in the experiment period by 3 and 4%, respectively, in the control group and in group I of the peptides enzyme and the low molecular peptides, whereas the low molecular weight peptide has decreased the lipid metabolism of the subjects by 8% in group II. This means that the addition of the low molecular weight peptide has resulted in no less than 10% reduction in the lipid digestion, because both Group I and the control showed increases, while group II showed an 8% decrease.

EXAMPLE 8

As is well known, excessive fat intake leads to obesity. In this experiment, a high-fat feed containing 30 wt. % of fat had added thereto 1 wt. % of the low molecular weight peptides of the invention. This was fed to test mice for 4 weeks, and body weight and fat tissue weight of the animals were measured. The results, as shown in Table V, indicate apparent reduction in the fat tissue weights in those animals administered the low molecular weight peptide, as compared to those not receiving the peptides. From this result, it may be concluded that the lipid metabolism promoting agent of the invention, when added to such high-fat food or feed, suppresses digestion and absorption of fat and may consequently promote lipid metabolism, thereby reducing the body fat. A further observation reveals that the animal protein based low molecular weight peptide is superior in its effect to the plant protein based low molecular weight peptide.

EXAMPLE 9

Chocolate is a sweet containing more than 35 wt. % of fat. A specially made chocolate was prepared by adding 10 wt. % of low molecular weight peptides derived from red blood corpuscles in accordance with the invention, to a commercially available reference chocolate. This specially prepared chocolate was forcibly fed to groups of beagles. Measurements were conducted by cross-over methods to observe the time course of changes in blood cholesterol and triglyceride values in the animal. Table VI shows the results. Area-under-curve values (AUC, mg.hr/dl) and maximum blood concentration values (C max, mg/dl) were obtained with reference to the changes in the blood concentration in the measurement values. As shown, a significant reduction in these values with the group fed with the special chocolate in comparison with the group fed with the reference chocolate was observed.

EXAMPLE 10

In a marine farm raising yellow tails, a feed containing 0.2 wt. % of the red blood corpuscle derived low molecular weight peptide was fed to the fish for 1 month. Through arbitrary choice, some fish were processed into "sashimi" (sliced raw fish meat). A blind taste test was conducted among 18 volunteers on the test of the meat of those fish fed with the peptide-containing feed and on those fed with the reference feed alone. In the results tabulated in Table VII, tasting impressions of the volunteers were numerically ranked with higher numerical values indicating better taste. As shown, the volunteers clearly preferred those fish fed with the peptide-containing feed. More particularly, the volunteers described the meat of fish fed with the reference feed alone with such negative expressions as oily, sticky, smelly or too sour while describing the meat fed with the inventive agent with such positive expression as plain, lean, tasty or the like. That is, the volunteers evaluated the fish meat obtained from fish fed of the low molecular weight peptides of the present invention highly, thereby suggesting the reduction in the fat amount and improvement in the fat composition quality due to the invention. Further, from this fact, it may be reasonably assumed that administration of the low molecular weight peptide of the invention will prevent decomposition of fish meat attributable to excessive body fat content thereby effectively preserving and prolonging the freshness of the product.

As may be readily seen from the above experiments, through administration of the low molecular weight peptides having an average amino acid chain length of about 3 to 4 in a dosage of 0.5 to 50% relative to the fat intake, the digestion and absorption of the lipid may be suppressed. In addition, lipid metabolism may be improved.

The lipid metabolism promoting agent of the present invention may be readily administered with an additive, by itself, or as a blend of mixture of other substances in medicines, foodstuffs or feed (including both blended feeds and mixed feeds). When the agent per se is used as foodstuff or feed, the agent may be effectively utilized as a physiologically functional food or feed capable of suppressing digestion and absorption of fat and of lowering high blood pressure, treating arteriosclerosis or treating obesity in the human body, the agent may be used selectively in the form of any medicine, foodstuff or a food additive. Similarly, in the case of its use in the livestock or marine product industry, the agent may be used selectively in the form of medicine, feed, or a food additive.

When used for the purpose of preventing or treating high blood pressure, arteriosclerosis or obesity in the human body, it is preferred that the agent be used as a physiologically acceptably foodstuff, since this use permits ready control of intake proportion relative to total fat intake. Moreover, in the marine product industry where in-body fat growth or accumulation may be easily assessed through dissection of observation of sampled fish body, the amount of fat in the animal meat may be readily improved by controlling the amount of the lipid metabolism promoting agent of the invention administered in accordance with the assessed growth or accumulation of the body fat in the animal meat.

TABLE IV

| (Experiment 4) Percentage of lipids digested | | | |
|---|---|---|---|
| | reference group | group I | group II |
| control period | 68 | 62 | 65 |
| treatment period | 71 | 66 | 57 |
| difference | +3 | +4 | −8 |

TABLE V

| (Experiment 5) (body weight and fat tissue in grams) | | | | | | |
|---|---|---|---|---|---|---|
| | ♂ | | | ♀ | | |
| feed | body weight | fat tissue | ratio | body weight | fat tissue | ratio |
| A | 36.5 | 2.0 | 5.5 | 29.0 | 1.8 | 6.0 |
| B | 36.9 | 1.6 | 4.4 | 29.2 | 1.4 | 4.6 |
| C | 34.8 | 1.3 | 3.3 | 29.3 | 1.3 | 4.2 |
| D | 36.9 | 1.8 | 4.8 | 29.3 | 1.4 | 4.9 |

A a high fat feed (reference)
B a low molecular peptide obtained from a red cell protein,
C a low molecular peptide obtained from fish powder protein,
D a low molecular peptide obtained from soya protein.

TABLE VI (Experiment 6)

| group | triglyceride | | cholesterol | |
|---|---|---|---|---|
| | AUC | Cmax | AUC | Cmax |
| reference | 445 | 182 | 100 | 27 |
| with red cell peptide | 304 | 126 | 19 | 9 |

TABLE VII (Experiment 7)

| sex | number | reference | with red cell peptide | with food additives |
|---|---|---|---|---|
| M | 11 | 16 | 46 | 27 |
| F | 7 | 11 | 13 | 21 |
| total | 18 | 27 | 59 | 48 |

As described above, the lipid metabolism promoting agent and its use relating to the present invention is suitable for preventing or treating high blood pressure or arteriosclerosis or for improving meat quality of cattles or fish in the field of the livestock industry and the marine products industry.

The terms and expression which have been employed are used as terms of description and not of limitation, and there is no intention in the use of such items and expressions of excluding any equivalents of the features shown and described or portions thereof, it being recognized that various modifications are possible within the scope of the invention.

We claim:

1. Composition of matter produced by contacting red blood corpuscles with a proteolytic enzyme obtained from *Aspergillus niger*, for a period of from 3 to 48 hours, at a temperature of from 20° C. to 70° C., to digest at least a portion of protein in such red blood corpuscles to tripeptides and tetrapeptides.

2. A food product which comprises the composition of matter of claim 1 and an edible material.

3. The food product of claim 2, wherein said food product is an animal feed.

4. A food product comprising the composition of matter of claim 1 and a fat, wherein said composition of matter is present in an amount ranging from 0.1 to 50 weight percent relative to the amount of fat present in said food product.

5. A method for reducing triglyceride levels in a subject in need thereof, comprising administering to a subject in need thereof an amount of a composition of matter produced by contacting red blood cells with a proteolytic enzyme for a period of from 3 to 48 hours, at a temperature of from 20° C. to 70° C. to digest at least a portion of protein in said red blood cells to tripeptides and tetrapeptides.

6. The method of claim 5, wherein said subject suffers from high blood pressure.

7. The method of claim 5, wherein said subject suffers from arteriosclerosis.

8. The method of claim 5, wherein said subject suffers from obesity.

* * * * *